United States Patent Office 2,839,428
Patented June 17, 1958

2,839,428

METHOD OF INHIBITING OXIDATION OF TIN-PLATE

Aner N. Laubscher, Penn Township, Allegheny County, Pa., assignor to United States Steel Corporation, a corporation of New Jersey No Drawing. Application April 26, 1956
Serial No. 580,700

2 Claims. (Cl. 117—132)

This invention relates to a method of treating tin-plate to inhibit oxidation of the tin coating in storage, and the resulting product.

It is customary in the manufacture of tin-plate, to apply to the coated product a chemical oxidation preventive and a film of lubricant such as cottonseed oil thereover. Dibutyl and dioctyl sebacates have been used as substitutes for cottonseed oil.

I have discovered a group of organic compounds having special properties, which offer peculiar advantages as lubricant coatings for tin-plate. This group is composed of the following:

Di (2-ethyl hexyl) phthalate
Di (2-ethyl hexyl) hexahydrophthalate
Triethylene glycol di (2-ethylhexoate)
Tetraethylene glycol di (2-ethylhexoate)
Polymers of polyalkylene glycols ("Ucon" 625, manufactured by Carbide and Carbon Chemicals Company, a Division of Union Carbide and Carbon Corporation)

All these compounds have, within the desired range, all the essential characteristics rendering them eminently satisfactory for the purpose specified. They are applied to the tin-plate after chemical treatment thereof, in the same manner as cottonseed oil, i. e., by electrostatic spraying or by dipping in a water emulsion of the compound.

Among the several qualities necessary in a protective coating for chemically treated tin-plate is a suitable viscosity. This is particularly important for electrostatic spraying, to insure fine atomization and uniform distribution. The viscosity should therefore be less than 500 centipoises at 25° C. The pour point or melting point should also be below atmospheric temperatures normally encountered.

Perhaps the most important quality of a suitable tin-plate coating compound is stability. This property can best be evaluated in terms of the half life or the time required for the apparent amount of the coating film to diminish to one half of its original value as measured by conventional solvent extraction procedures. This half life should be at least four months. With proper application, compounds having such a half life will remain present in sufficient quantity to give the desired protection for at least a year. I have discovered that the stability of a coating film is critically related to its vapor pressure. A film of a material having a vapor pressure below a definite minimum shows an increase in stability to an extent far out of proportion to the actual reduction in vapor pressure. More specifically, the vapor pressure of the coating component must be below 10 mm. of mercury at 227° C. in order for it to remain on the product in sufficient quantity for the desired period of one year.

The aforementioned properties are all related to the molecular weight of the compounds which should be at least 390.

The tin-plate coating medium must have sufficient lubricity to facilitate the handling of sheets by automatic machinery, such as container manufacturing facilities, and to resist scratching or abrasion thereby. As an index thereof, the coefficient of friction of the medium when applied to the tin-plate should be less than .3.

A further important property is freedom from unsaturated linkages subject to oxidation because such reaction leads to loss of lubricating and protective effects. This property is indicated by the iodine number which should be zero.

Finally, a coating compound, to be satisfactory for tin-plate used in container manufacturing must be compatible with the lacquers applied thereto as protective or decorative coatings.

The compounds of this group listed above all satisfy the foregoing criteria as shown by the following table giving the values characteristic thereof in respect to the several measurable indices:

*Table I*

|  | Ucon 625 | Tetraethylene Glycol Di (2-ethylhexoate) | Di (2-ethylhexyl) Phthalate | Triethylene Glycol Di (2-ethylhexoate) | Di (2-ethylhexyl) Hexahydrophthalate |
|---|---|---|---|---|---|
| Molecular Weight | [1] 625 | 490 | 391 | 403 | 397 |
| Viscosity, cp. at 25° C. | 344 | 27 | 71 | 21 | 44 |
| Pour Point or Melting Point, ° C. | [1] −20 | −55 | −46 | −59 | [1] −20 |
| Lubricity, Coefficient of Friction [2] | 0.278 | 0.280 | 0.282 | 0.272 | 0.284 |
| Vapor Pressure, mm. at 227° C. | 1.0 | 1.6 | 4.4 | 5.4 | 8.0 |
| Oil Film Stability, Half life, months [3] | 44 | 16 | 4.9 | 4.9 | 4.9 |
| Iodine Number | ---- | 0 | 0 | 0 | 0 |
| Lacquer Compatibility [4] | Yes | Yes | Yes | Yes | Yes |

[1] Estimated or average value.
[2] Coefficient of friction of tin-plate with 0.20 gram/base box oil. Coefficient of friction for the unoiled tin-plate being 0.403.
[3] Original oil film, 0.20 gram/base box.
[4] Phenolic lacquer sprayed on oiled tin-plate.

My invention has the advantage of providing a protective coating having a longer effective life than either cottonseed oil or dibutyl sebacate. It thus permits storage of tin-plate for a longer time than has been feasible heretofore. It also eliminates the difficulties which have been experienced in soldering and lacquering, by prolonging the effect of the chemical treatment in resisting oxidation of the coating layer of tin.

Although I have disclosed herein the preferred practice of my invention, I intend to cover as well any change or modification therein which may be made without departing from the spirit and scope of the invention.

I claim:
1. A method of inhibiting oxidation of a tin surface comprising applying thereto a coating of a liquid polymer of polyalkylene glycols having a viscosity of less than 500 centipoises at 25° C., a vapor pressure less than 10 mm. of mercury at 227° C., a molecular weight of about 625 and effective to impart to said surface a coefficient of friction less than about .3.

2. A method of inhibiting oxidation of a tin-surface comprising applying thereto a coating of an organic liquid having a viscosity of less than 500 centipoises at 25° C., a vapor pressure less than 10 mm. of mercury at 227° C., a molecular weight of about 400 and imparting to said surface a coefficient of friction less than about .3, said liquid being selected from the group consisting of di (2-ethyl hexyl) phthalate, di (2-ethyl hexyl) hexahydrophthalate, triethylene glycol di (2-ethylhexoate), tetraethylene glycol di (2-ethylhexoate), and mixtures thereof.

References Cited in the file of this patent

UNITED STATES PATENTS

| | | |
|---|---|---|
| 2,393,866 | Wassell | Jan. 29, 1946 |
| 2,445,431 | Hill | July 20, 1948 |
| 2,573,982 | Waters | Nov. 6, 1951 |
| 2,683,100 | Edger | July 6, 1954 |

OTHER REFERENCES

"Synthetic Organic Chemicals," Twelfth Ed., July 1, 1945. (Copy in Div. 64.)